July 27, 1943.  F. W. SCHARF  2,325,551
TIMED COOKER
Filed July 8, 1940   10 Sheets-Sheet 1

Fig. 1.

Inventor
Frank W. Scharf
By Oscar W. Fiss
Attorney

July 27, 1943.  F. W. SCHARF  2,325,551
TIMED COOKER
Filed July 8, 1940   10 Sheets-Sheet 2

Fig. 2

Inventor
Frank W. Scharf
By Oscar W. Fiss
Attorney

July 27, 1943.　　　F. W. SCHARF　　　2,325,551
TIMED COOKER
Filed July 8, 1940　　　10 Sheets-Sheet 4

Inventor
Frank W. Scharf
By Oscar W. Giese
Attorney

July 27, 1943.       F. W. SCHARF             2,325,551
                     TIMED COOKER
             Filed July 8, 1940        10 Sheets-Sheet 5

Inventor
Frank W. Scharf
By Oscar W. Fiese
Attorney

July 27, 1943.　　　F. W. SCHARF　　　2,325,551
TIMED COOKER
Filed July 8, 1940　　10 Sheets-Sheet 6

Fig. 8

Inventor
Frank W. Scharf
By Oscar W. Giese
Attorney

July 27, 1943.  F. W. SCHARF  2,325,551
TIMED COOKER
Filed July 8, 1940    10 Sheets-Sheet 8

Inventor
Frank W. Scharf

By Oscar W. Giese
Attorney

July 27, 1943.  F. W. SCHARF  2,325,551
TIMED COOKER
Filed July 8, 1940  10 Sheets-Sheet 9

Inventor
Frank W. Scharf
By Oscar W. Giese
Attorney

July 27, 1943.  F. W. SCHARF  2,325,551
TIMED COOKER
Filed July 8, 1940   10 Sheets-Sheet 10

*Fig. 16*

Inventor
*Frank W. Scharf*

By  *Oscar W. Giese*
Attorney

Patented July 27, 1943

2,325,551

UNITED STATES PATENT OFFICE 2,325,551

TIMED COOKER

Frank W. Scharf, Marshall, Mich., assignor to McGraw Electric Company, Elgin, Ill., a corporation of Delaware Application July 8, 1940, Serial No. 344,437

27 Claims. (Cl. 161—16)

My invention relates to heating devices, and particularly to cookers such as electric automatic toasters, waffle irons, and the like. To insure successful operation heating devices of the types mentioned require timing mechanism which will operate accurately under all conditions of use to establish the proper operating period for the heating means. The first requirement for a timing mechanism for the purpose indicated is that the timing period for operation of the heating means shall be terminated at such time after the beginning thereof so that the article shall be cooked to a desired degree and neither overcooked nor undercooked; and the timing mechanism should be capable of adjustment so that the cooking period can be regulated arbitrarily to suit individual taste. The second requirement for a timing mechanism for the purpose indicated is that it shall be automatically compensated for varying temperature conditions in the apparatus, and caused to lengthen or shorten the timing period accordingly, so that uniform results in cooking may be secured under repeated operation, regardless of the temperature at the beginning of each operation of the apparatus as determined by the rapidity with which successive cooking operations are carried out. For example, in the case of an automatic electric toaster the toasting action must continue for a longer time period on the initial slice of bread introduced, when the apparatus is started cold, than in the case of a slice introduced subsequently when as the result of a previous toasting operation the apparatus is relatively hot, and it will generally follow that the toasting time period must be varied in dependency on the rapidity with which successive toasting operations are carried out in order to insure uniformity of results.

According to the present invention the timing mechanism for establishing the time period for cooking operations consists solely of thermostatic mechanism. As one characterizing feature of the invention, thermostatic means is provided which fixes the beginning as well as the end of the time period for the cooking operation. A further characterizing feature of the invention is that in conjunction with thermostatic means for establishing the cooking time period there is provided further thermostatic means responsive to variations in the temperature conditions in the cooking space to lengthen or shorten the cooking period established by the first thermostatic means, thereby to insure the same degree of cooking or browning of successive slices of toast, waffles or other articles.

The main timing means according to the invention will comprise thermally responsive means provided with heating means which initially operates to heat the same up from an uncertain or variable cool or low starting temperature to a predetermined higher temperature and then operates to permit the thermostatic means to cool. To secure precision in operation the heating of the thermostatic means to the higher temperature will be carried out, preferably rapidly, as a preliminary operation before the start of the cooking period, and the cooking period will commence only when the thermostatic means has moved to its high temperature position, at which time its cooling period begins. With such an arrangement the cooking period is always initiated when the thermostatic means is at the same predetermined (high) temperature position, and variations in the interval for the thermostatic means to reach its high temperature position from its uncertain cool or low starting temperature has no effect on the length of the cooking period. The interval required for cooling of the thermostatic means from the predetermined high temperature to which it has been initially heated down to a predetermined cool or relatively low temperature, since it is invariable or constant, provides a very satisfactory time range for establishing the cooking period.

Normally, the cooking period will be coextensive with the cooling period of the thermostatic means, being commenced when the thermostatic means has been moved by preliminary heating to its predetermined high temperature position and being terminated at the end of the cooling period when the thermostatic means has moved to its predetermined low temperature position. Such an operating arrangement is desirable in that it permits the use of a single thermostatic member which invariably begins and ends the cooking period at fixed temperature positions of the member and sets the length of the cooking period as the time required for it to move from its high to its low temperature position. On the other hand, it is further contemplated according to the invention as an alternative arrangement, as where the form of thermostatic means is such as to have a relatively rapid cooling period, that the thermostatic means shall not upon reaching its cool position render the main heating means inoperative, but upon reaching such position shall set into operation control means which will prolong the cooking period and terminate such period at a later time.

It is of course desirable that the cooling period of the thermostatic means may be lengthened or shortened so that the cooking period may be arbitrarily varied to suit individual taste. It is proposed, therefore, to provide adjustment means for varying the operating temperature range of the thermostatic means so as to permit lengthening or shortening of the cooling period of said means and consequently lengthening or shortening of the cooking period.

For purposes of the invention I prefer to utilize a snap action type of thermostatic means which after preliminary heating from its initial uncertain low temperature position will move to its hot position with a snap action as soon as it reaches a predetermined high temperature and thereupon start cooling. Such means will remain at its high temperature position during its cooling period and will move from such position to its cool position only after it has attained a predetermined low temperature. Utilizing a thermostat operating in such manner enables me to provide a simple form of timing mechanism whereby, at least in the preferred form of the invention, the snap action thermostat will initiate the cooking period as it snaps to its hot position, and terminate the cooking period after cooling as it snaps to its low temperature position.

As previously mentioned the invention further contemplates the provision of a variable control of a thermostatic type which will automatically operate to lengthen or shorten the cooking period, set by the previously explained heat-up cool-off main thermostatic means, in accordance with variations in temperature conditions in the cooking or toasting chamber of the apparatus. The variable control means is arranged to delay or hasten the termination of the cooking period preferably, although not necessarily, by acting through the main thermostatic timing means, as by lengthening or shortening the cooling period thereof. For the variable control, I prefer to use a special form of thermostat so located as to be subject to the heat conditions in the cooking chamber. Instead of using a bimetallic or other thermostatic element movable in response to variations in temperature conditions I propose to utilize a thermally responsive electric current conductive device which changes its conductivity with variations in temperature. Such control device can take the form of an electrical resistance element having a high temperature coefficient of electrical resistance so as to be sensitive to, and change its electric conductivity with, variations in temperature condition in the cooking space. By incorporating such resistance in the circuit of the control mechanism which serves to terminate the cooking period, I find that an arrangement may be provided which will vary the cooking period in dependency on variations in temperature condition of the cooking chamber with a high degree of accuracy. For example, the electrical resistance element control means may be placed in a circuit with an electric heater operating on the main thermostatic means during its cooling period to lengthen such period, in such arrangement that the hotter the cooking space, and the greater the effective resistance of the resistance element, the less the current that will flow through the heater for the main thermostatic means and consequently the shorter the cooling period of the latter.

The timing mechanism of the invention is particularly useful as an automatic control device for initiating and terminating operation of the heating means of a cooking apparatus. In such usage the thermostatic timing means will initiate operation of the heating means at the beginning of the cooling period of the thermostatic means after preliminary heating thereof to its predetermined high temperature, and termination of operation of the heating means will be brought about in dependency on cooling of the thermostatic means to its low temperature position. On the other hand, in some cases, as in a waffle baker where it is ordinarily desirable not to discontinue operation of the heating means between successive bakings, the timing mechanism of the invention may establish the cooking period through signal means, such as a signal light or audible signal device, merely to indicate when cooking of the article should be started and stopped. Again, the timing mechanism of the invention may perform a duel function of controlling the time period of operation of the heating means of a cooking apparatus, and of operating signal means which will visually or audibly indicate the cooking period.

Figure 10:
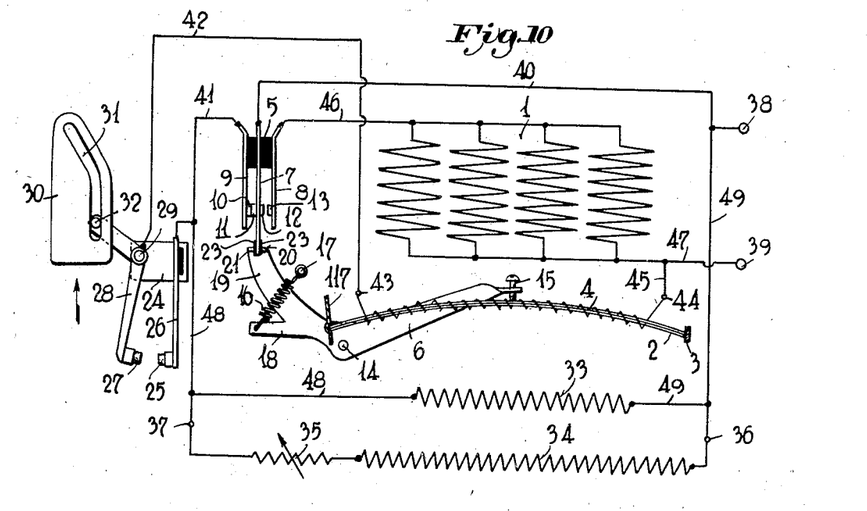
Figures 10 and 11 are diagrammatic views illustrating the operating circuit of the embodiment shown in Figures 1 and 8, and illustrating different operating positions of the parts under different conditions.
Figure 11:
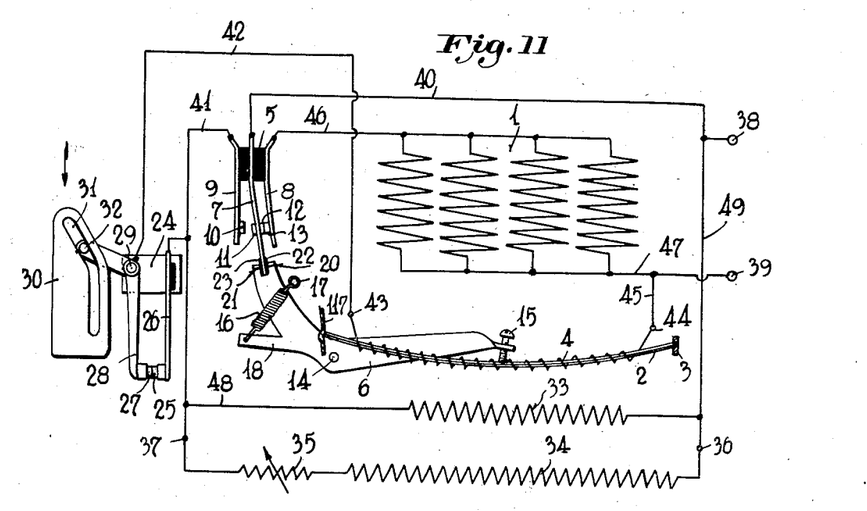
Figure 12:
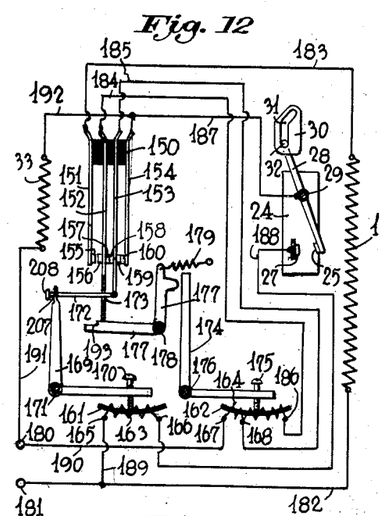
Figures 12 through 15 are diagrammatic views illustrating the operating circuits of the embodiment of the invention shown in Figure 9.
Figure 13:
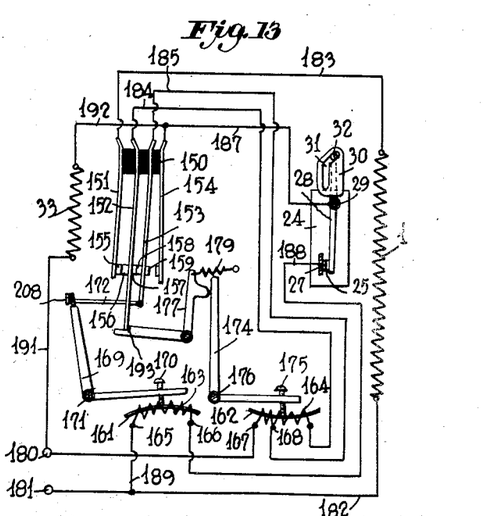

While being applicable to various types of cooking devices, or other heating devices wherein the operating period of the heating means must be timed with considerable precision, the invention finds particular utility in connection with automatic electric bread toasters, and will be described in detail in conjunction with a cooking device of such type as illustrated in the accompanying drawings wherein:

Figures 1 through 8 illustrate the preferred embodiment of my timing mechanism employed as a heater control in an automatic electric toaster;

*Diagram views, Figures 10 and 11*

Before describing in full the drawings which illustrate the main embodiment of my invention, the operating mechanism shown diagrammatically in Figures 10 and 11 will be described.

In these figures 1 represents the main heater for the cooker. The heater may be of any desired type, but the preferred form as shown is an electrical resistance heating unit.

I provide a thermally responsive control for the heater consisting of the bimetallic member 2. Whereas my thermostatic control may utilize thermally responsive members of bimetal or of a simple expanding bar, I prefer the snap action thermostat shown in these figures. As will be observed member 2 is held under resilient compression between supports 3 and 117, and assumes a curved shape.

I provide means for heating the thermostatic control, which, as shown, may consist of an electrical resistance 4 placed in heat exchange relationship to bimetal member 2. Resistance 4 may be conveniently wound around the bimetal member 2 being insulated therefrom by suitable material.

I provide control switch 5 which is operated by the thermostatic control member through lever 6. Lever 6 is pivoted at 14 and is actuated by the bimetallic member 2 through the adjustable member 15. Spring 16 fixed at 17 and attached to arm 18 of lever 6 biases the lever to maintain engagement between the bimetal member 2 and adjustable member 15. Arm 19 of lever 6 carries detents 20 and 21 which engage leaf 7 of switch 5, being insulated therefrom at 22 and 23. It will therefore be apparent that control switch 5 is operated through lever 6 upon movement of the bimetallic member 2.

I also provide main switch 24 consisting of contact 25 carried on spring 26 and contact 27 carried on movable arm 28. Arm 28 is pivoted on pin 29 and is actuated by engagement of pin 32 with the sides of slot 31 in cam plate 30. As will be described later in connection with the specific embodiment of the invention, cam plate 30 is spring biased to a raised position and may be manually lowered to close switch 24 to operate the timed cooker.

For controlling the heat supplied to the thermostatic control, I provide control means for the thermostat heater which operates in dependency on the temperature of the main heater 1. This preferably consists of an electrical resistance 33 having a high temperature coefficient of electrical conductivity and adapted to be heated by the main heater. The change in value of the resistance in dependency on the temperature to which the article to be cooked is subjected is utilized for controlling the cooking period.

I also contemplate the use of my thermally responsive resistance for controlling the timing period of other types of timers known in the art.

If it is desired to provide a manual control for varying the length of the cooking period operating in joint control of the heater with the thermally responsive resistance, a variable resistance may be used to vary the current supplied to the thermostat heater. This may be accomplished by attaching variable resistance 35 operating in series with fixed resistance 34 to posts 36 and 37 in parallel with the thermally responsive resistance 33.

*Operation*

A source of electric current for the operation of the heater may be connected to the posts 38 and 39. Conductor 40 leads from post 38 to leaf 7 of control switch 5. In its cold position, bi- metal 2 by arm 19 of lever 6 forces leaf 7 against leaf 9 to close contacts 10 and 11. Conductor 41 leads from leaf 9 of switch 5 to leaf 26 of switch 24. Conductor 42 connects arm 28 of switch 24 to lead 43 of thermostat heater 4. Conductor 45 connects lead 44 of thermostatic heater 4 to post 39.

Upon lowering of cam plate 30, switch 24 is closed, as is shown in Figure 11. As will be described below, this movement of cam plate 30 may be accompanied by movement of an article carrier to move the article to be cooked into proximity with main heater 1. Latching means, not shown in these figures, are provided for holding cam plate 30, and if desired, the article carrier, in lowered position.

Closing of switch 24, through contacts 10 and 11 of switch 5, completes a circuit to thermostat heater 4 from posts 38 and 39. Energization of thermostat heater 4 immediately heats bimetal member 2. When the rise in temperature of the bimetal member produced a strain therein sufficient to overcome the compression of supports 3 and 117 on the member, the same snaps over into the opposite curvature, as shown in Figure 11.

Due to the fact that the full line voltage is applied to the thermostat heater 4, heating up of the bimetal member 2 takes place very rapidly, and it operates to reverse its position within a very few seconds.

As is shown in Figure 11, movement of bimetal member 2 upon heating actuates lever 6 to connect contacts 12 and 13 of switch 5 through the action of detents 20 and 21 on leaf 7. This completes a circuit for conductor 40 to conductor 46 through switch 5. Conductor 46 leads to main heater 1 which is connected to post 39 by conductor 47, and consequently the actuation of switch 5 energizes the main heater.

Simultaneously with the connection of contacts 12 and 13, contacts 10 and 11 are opened to break the circuit from the line to thermostat heater 4. This permits bimetal member 2 to cool. Bimetal member 2 maintains the position shown in Figure 11 until sufficient strain is set up by the loss in temperature to cause it to snap over into the position shown in Figure 10. This operation of the thermostat on becoming cold returns switch 5 to the position shown in Figure 10 and opens contacts 12 and 13 to disconnect the main heater.

The period required for the thermostat to cool constitutes the cooking period during which the main heater is energized. It will be understood that this mode of operation permits an immediate successive operation of the heater by the thermostatic timer, and does not require an intermediate period to restore the thermostatic control to an operative condition.

My invention also incorporates means for delaying the cooling of the thermostat in order to produce the desired period of heat treatment. For this purpose, conductor 48 connects lead 43 of the thermostat heater 4, through conductor 42 and switch 24, to post 38 through resistance 33 and conductor 49. The other lead 44, of thermostat heater 4 is connected to post 39 by conductor 45. This circuit is operative to continue energization of thermostat heater 4 after the bimetal member snaps into the hot position shown in Figure 11. Resistance 33 is chosen to have a high value so that the current flowing through thermostat heater 4 permits bimetal member 2 to maintain a continuous fall in temperature, but the heat supplied by resistance 4 is operative to delay the loss of temperature sufficiently to prolong the interval before bimetal member 2 snaps back into cold position as shown in Figure 10.

It is well known that during a succession of timed cooking operations in a device of this character the temperature in the cooking chamber gradually rises. In order to accomplish a diminution in the cooking period for obtaining equal heat treatment despite the variation in temperature during a series of operations, I position resistance 33 so as to be subject to the heat of the main heater in the cooking chamber. It will be understood that as the temperature of resistance 33 rises with the temperature in the cooking chamber its electrical resistance increases. In order to obtain the best control, I use a resistance having a high temperature coefficient of electrical conductivity. For this purpose the resistance may be composed of iron, or of an alloy of iron and nickel.

As the temperature of resistance 33 increases its electrical resistance rises and decreases the current flowing through heater 4 so that bimetal member 2 loses temperature more rapidly and therefore decreases the cooking period.

If it is desired to provide a manual control for adjusting the cooking period, this may be accomplished by providing a variable resistance operating to control the current flowing through thermostat heater 4 in addition to the control exercised by thermally responsive resistance 33. For this purpose I may attach variable resistance 35 to post 37 and connect in series therewith fixed resistance 34 connected to post 36. Variation of resistance 35 alters the current flowing through heater 4 so that the rate of temperature loss of bimetal member 2 can be varied. I provide fixed resistance 34 in order to prevent shunting of resistance 33 by a resistance of so low a value as to prevent adequate control of the cooking period by the thermally responsive resistance.

As will be described later in connection with the specific embodiment of my invention, I provide means operated by the thermostatic control member on cooling to release cam plate 30 simultaneously with the opening of contacts 12 and 13 of switch 5. At the same time the article carrier which was moved into cooking position by depression of cam plate 30 is released to remove the article cooked from proximity to heater 1.

Therefore, on cooling of the thermostatic control, the entire mechanism is returned to the condition shown in Figure 10 so that the device is immediately capable of performing a successive cooking operation in the manner described.

*Figures 1 to 8*

In Figures 1 to 8, inclusive, I have illustrated the preferred embodiment in an electric toaster in which the invention diagrammatically shown in Figures 10 and 11 is applied.

In the embodiment shown, provision is made for toasting two slices of bread at a time. The main heater 1 is composed of four resistances vertically arranged, providing one heating element for each side of each piece of bread. A movable carriage 51 is provided for lowering the bread into the toasting chamber.

Figure 1:
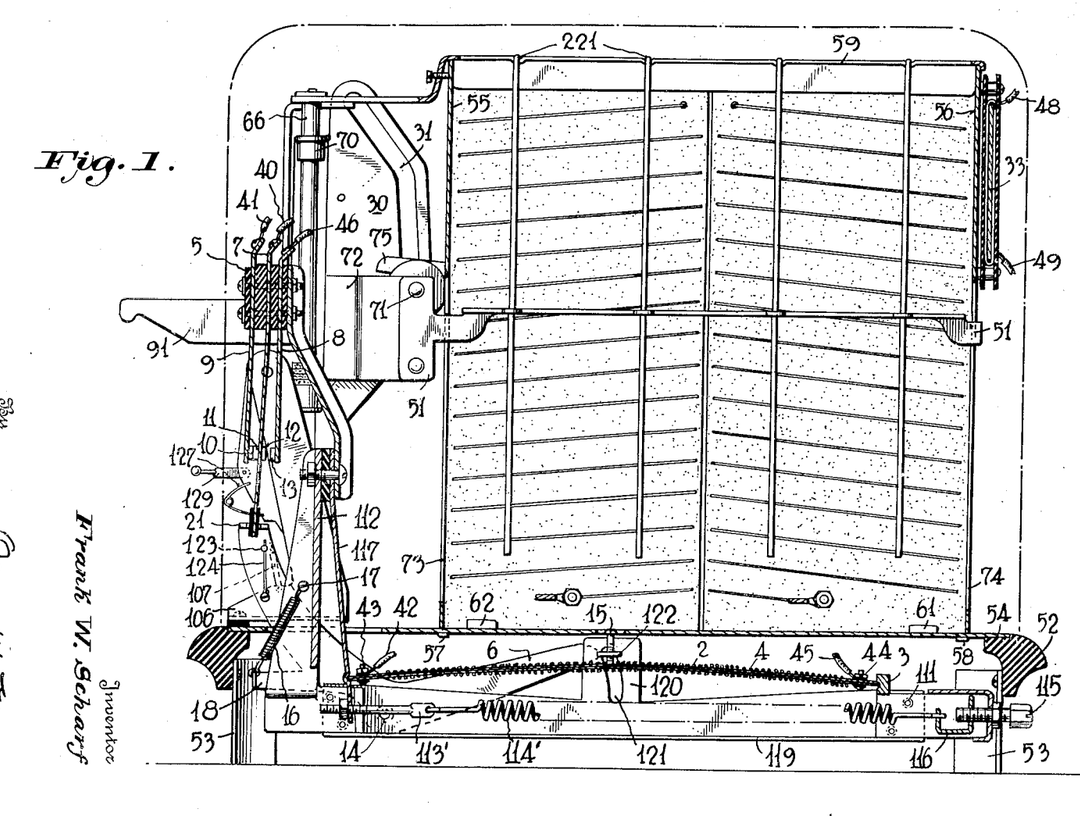
Figure 1 being a vertical front to rear section taken on the line 1—1 of Figure 8, showing one position of the mechanism.
Figure 2:
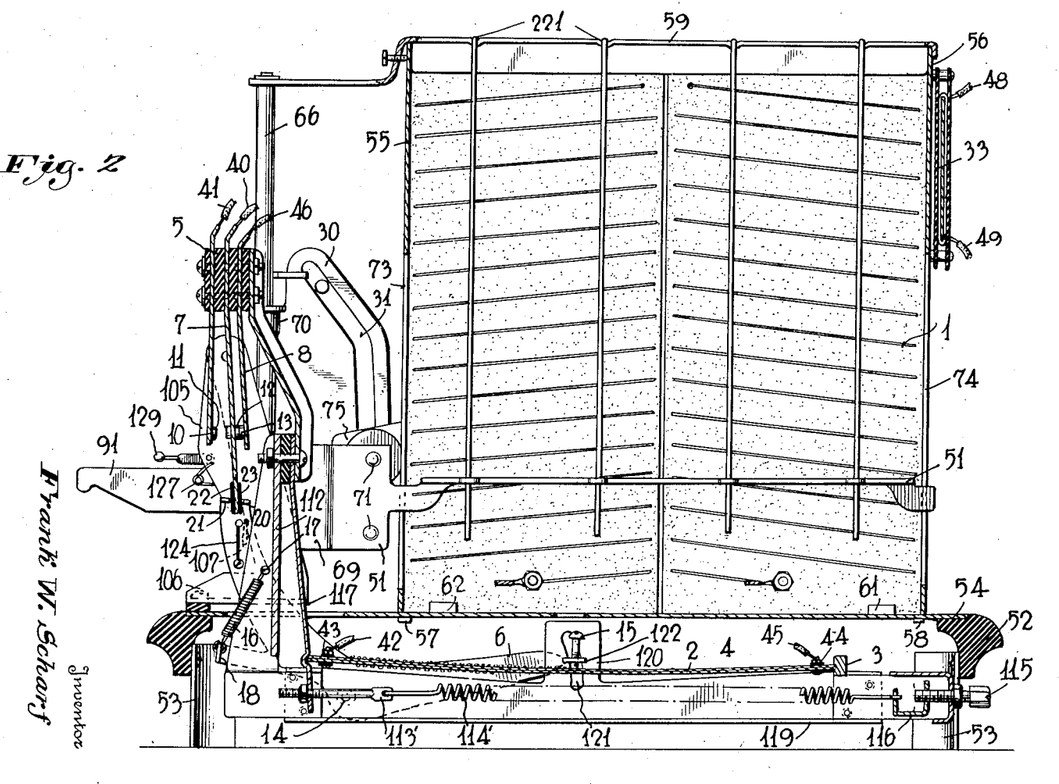
Figure 2 being a vertical front to rear section taken on the line 1—1 of Figure 8 showing another operating position of the mechanism.
Figure 4:
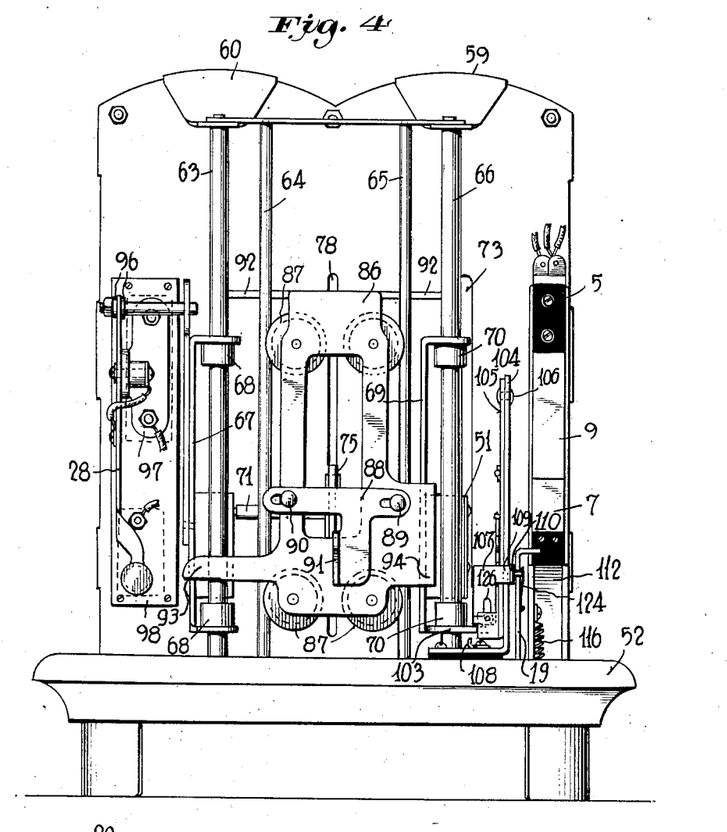
Figure 4 being a front elevation of the device.

As shown in Figure 1, I provide a main base member 52 having supporting legs 53. The base member carries plate 54 on which the mechanism is supported. Base plate 54 carries front plate 55 and rear plate 56, which are attached to the base plate by lugs 57 and 58 respectively. As shown in Figure 4, members 59 and 60 engage the upper edges of plates 55 and 56 and support the upper ends of the heating elements, as shown in Figure 1. The lower ends of the heating elements are retained in position by lugs 61 and 62.

As shown in Figure 4, vertical guides 63, 64, 65 and 66 are provided at the front end of the toaster, supported between members 59 and 60 and base plate 54. Guide 63 supports carriage 67 on bearings 68; and guide 66 supports carriage 69 on bearings 70. Carriages 67 and 69 are connected by bar 71. Carriages 67 and 69 each support a carrier for receiving the bread and for moving the same into and away from toasting position. As shown in Figure 1 carriage 69 is provided with rear extensions 72 to which is attached carrier 51, movable vertically in slots 73 and 74 of end plates 55 and 56, respectively.

Rods 221 are supported by member 59 and pass through apertures in the bread carrier. These rods prevent bread from coming into immediate contact with the heating elements. Identical structure to that shown in Figure 1 is provided for the toasting compartment shown on the left of Figure 4.

Figure 3:
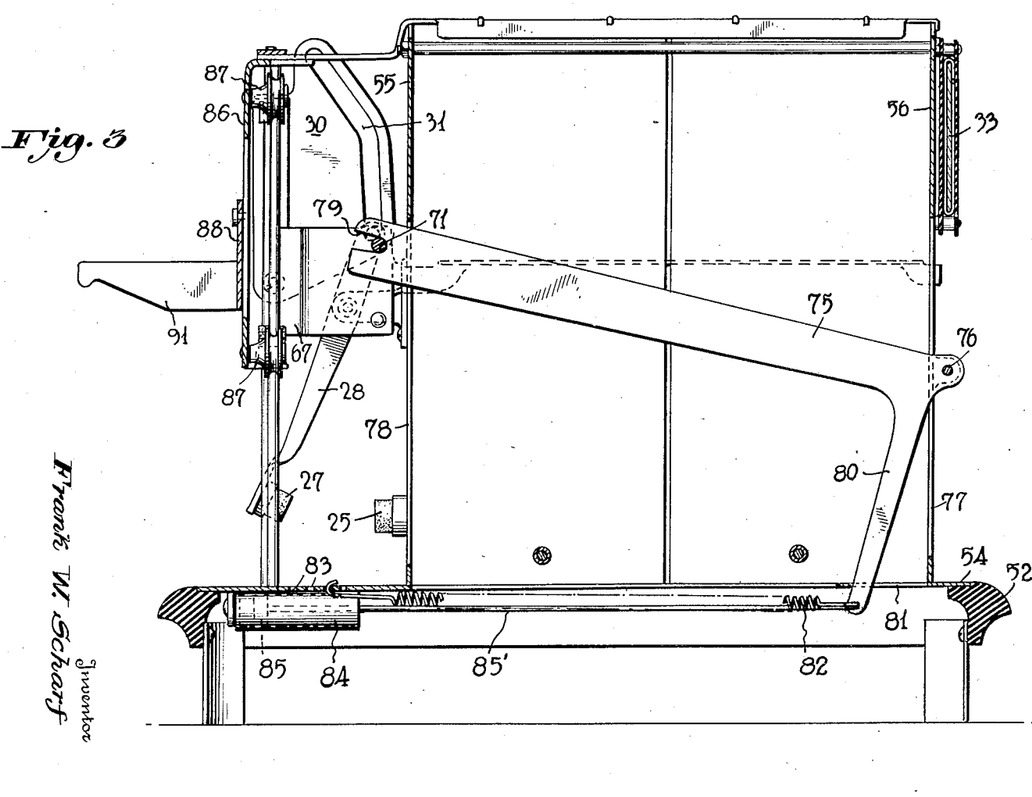
Figure 3 being a vertical front to rear section taken on the line 3—3 of Figure 8.

As shown in Figure 3, I provide lever 75 for actuating carriages 67 and 69. This lever is pivoted on pin 76 carried by rear plate 56 and operates in slot 77 of the rear plate. The forward end of the lever passes through slot 78 in front end plate 55 and engages bar 71 connecting carriages 67 and 69 in slot 79.

Figure 8:
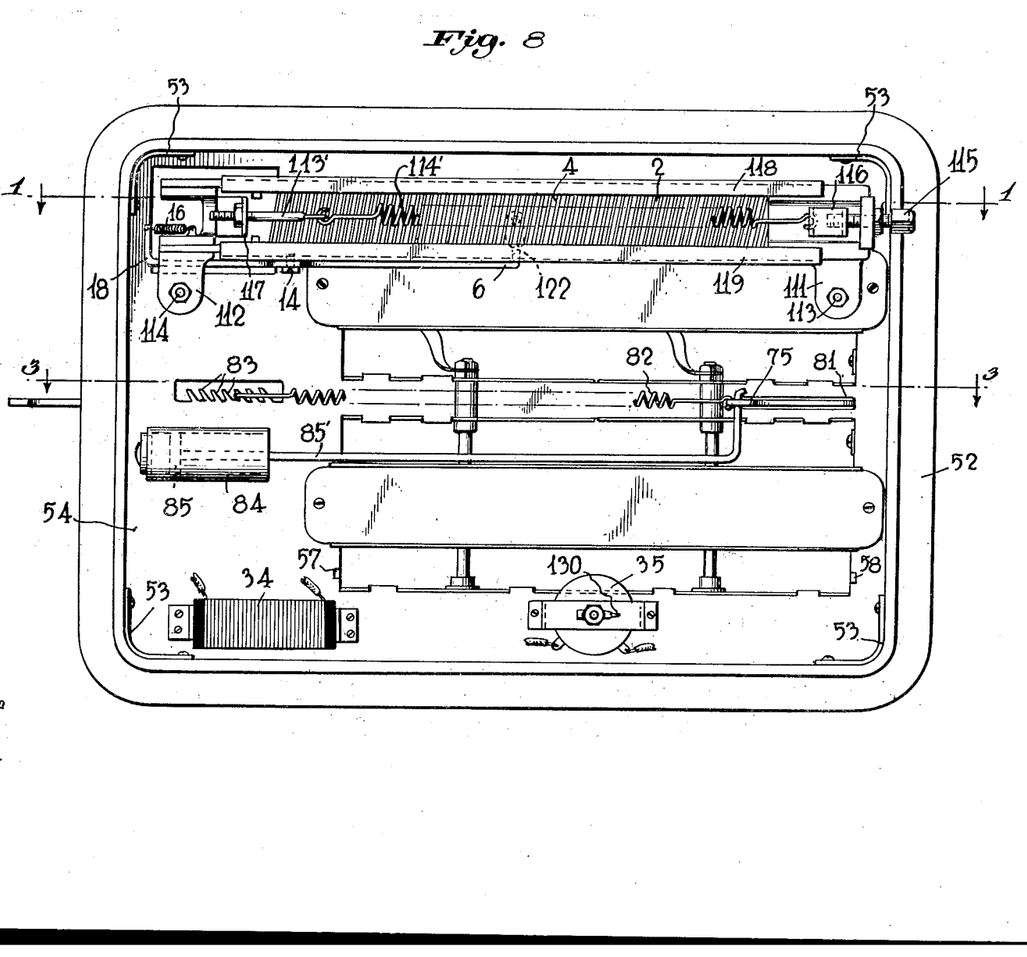
Figure 8 being a bottom view of the apparatus.

As shown in Figures 3 and 8, arm 80 of lever 75 extends through slot 81 of base plate 54 and is connected to spring 82 which is adjustably attachable to the front end of base plate 54 on teeth 83. The action of spring 82 biases carriages 67 and 69 toward the raised position.

The lower end of arm 80 also operates through connecting rod 85' to move piston 85 in cylinder 84 attached at the forward end of base plate 54. (See Figure 8.) This mechanism acts as a dashpot to effect gradual movement of carriages 67 and 69 under operation of lever 75. As shown in Figure 4, vertical guides 64 and 65 provide for movement of carriage 86 on rollers 87. Member 88 is attached to carriage 86 by rivets 89 and 90; and is formed with outwardly projecting handle 91 for operating carriage 86.

Figure 6:
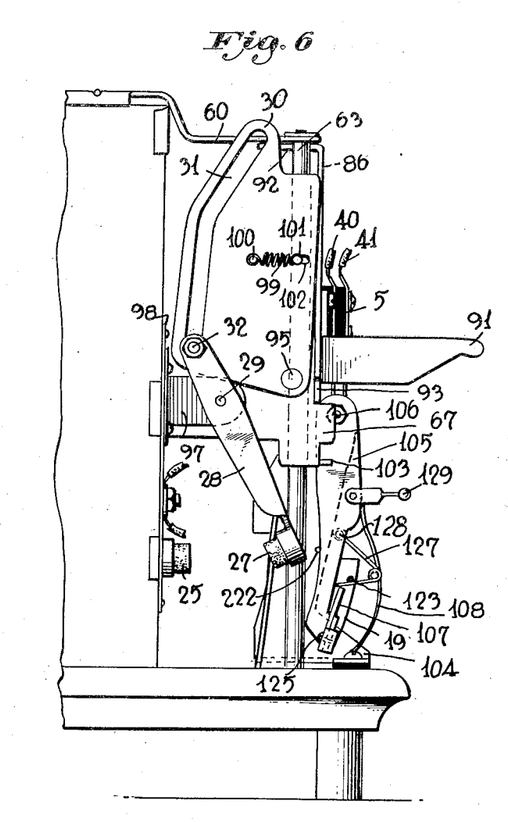
Figure 6 being a fragmentary side elevation showing the mechanism in one operating position.

At the upper end of carriage 86 is horizontal member 92 engageable with the undersurfaces of members 59 and 60 for limiting the upward movement of carriage 86 (see Figure 6).

Carriage 86 is provided at its lower end with lateral extensions 93 and 94 engaging carriages 67 and 69 respectively.

It will be understood that movement of carriage 86 by operating handle 91 lowers carriages 67 and 69 to move the bread carrier into cooking position.

Figure 7:
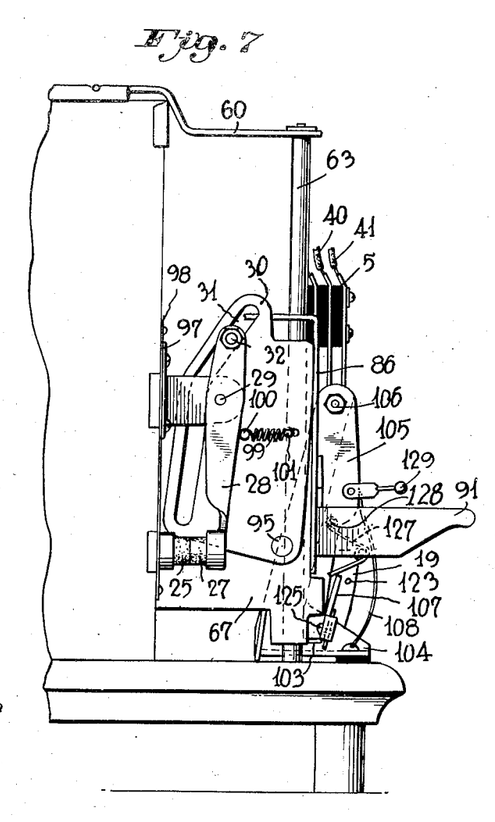
Figure 7 being a fragmentary side elevation showing the mechanism in another operating position.

As shown in Figures 6 and 7, carriage 67 supports cam plate 30 on pivot 95. Arm 28 carrying contact 27 of switch 24 is provided with pin 32 riding in slot 31. Pin 32 is insulated from arm 28 by elements 96 shown in Figure 4. Pin 29 is carried by bracket 97 mounted on insulating member 98. Insulating member 98 also carries contact 25.

Cam plate 30 is biased by spring 99 which connects pin 100 on plate 30 to pin 101 on carriage 67. Slot 102 in plate 30, through which pin 101 passes, allows for movement of plate 30 under tension of spring 99.

As shown in Figure 6, cam slot 31 is formed so that when carriage 67 is raised contacts 25 and 27 are open. As carriage 67 is lowered, the upper portion of slot 31 deflects arm 28 by pin 32 to connect contacts 25 and 27. The action of spring 99 provides a resilient pressure for holding switch 24 closed.

I provide means for latching carriages 67 and 69 in their lowered position engageable with extension 103 at the bottom of carriage 69. For this purpose I provide bracket 104 carried by the base plate 54. Arm 105 is pivoted to bracket 104 at pin 106, and pressed by spring 108 against stop 222 on bracket 104.

As best shown in Figure 6, the lower end of arm 105 carries inclined latch 107. As carriage 69 is lowered by operating handle 91, latch 107 and arm 105 are deflected by extension 103. As extension 103 passes below latch 107, spring 108 returns the latch to its original position and holds carrier 69 down as shown in Figure 7. As shown in Figures 6 and 7, latch 107 is movably mounted at the lower end of arm 105 by fixed pin 125 engaged in slot 126 of latch 107. (See Figure 4.) Spring 127, attached to arm 105 by screw 128 normally presses latch 107 downwardly so that pin 125 engages the upper end of slot 126. When extension 103 rises against latch 107, the latch rides up until pin 125 engages the lower end of slot 126.

Latch 107 also carries detent 109 having an inclined end face 110. This cooperates with the thermostatic control now to be described to release latch 107 and permit carriages 67 and 69 to be raised through lever 75.

As shown in Figures 1 and 8, a bimetal member 2 is mounted beneath base plate 54. Support 3 of the bimetal member is carried by bracket 111 mounted on stud 113.

Bracket 112 is mounted on stud 114 and at its upper end carries support 117 of the bimetal member. At its lower end support 117 is engaged by link 113' which receives spring 114' tensioned by screw 115 on bracket 111. Adjustment of screw 115, by threaded connector 116, varies the tension on spring 114' and thereby controls the compression on bimetal member 2. A variation in this compression results in changing the operating temperature required to operate the bimetal member.

Thermostat heater 4 is provided in heat exchange relationship with bimetal member 2, and is provided with leads 43 and 44.

Brackets 111 and 112 are connected by members 118 and 119. Member 119 is provided with upstanding portion 120 containing slot 121. Lever 6, pivoted at 14, carries an offset arm 122 working in slot 121 and overlying bimetal member 2. Arm 122 is threaded to receive adjustable screw 15 which bears against bimetal member 2. Spring 16 is connected between arm 18 of lever 6 and screw 17 on bracket 112, and causes screw 15 to ride against bimetal member 2 at all times.

As previously described in connection with Figures 10 and 11, arm 19 of lever 6 operates switch 5.

Arm 19, as shown in Figures 1 and 4, carries pawl 123 biased to the left by spring 124. This pawl cooperates with inclined face 110 of detent 109 of latch 107. As shown in Figure 7, when detent 103 of carriage 69 raises latch 107, extension 109 is raised to be engageable with pawl 123. As arm 19 carries pawl 123 past detent 109 on heating of member 2, inclined face 110 deflects pawl 123 and does not interfere with movement of arm 19. On return movement of arm 19 pawl 123 engages detent 109 and carries latch 107 with arm 105 outwardly to release detent 103 from latch 107 and permit carriages 67 and 69 to be raised by lever 75. As soon as the return movement of arm 19 carries latch 107 out of contact with detent 103, spring 127 returns latch 107 to its lower position as is shown in Figure 6. This frees arm 105 and latch 107 from the action of pawl 123, and spring 108 returns arm 105 to latching position for subsequent operation.

If it is desired to terminate the cooking operation and release carriages 67 and 69 before the end of the timing period, control handle 129 may be manually operated to release detent 103 from latch 107 by drawing arm 105 outwardly.

As shown in Figure 1, resistance 33 is mounted on rear plate 56 where it is subject to the heat of the main heater 1. Resistance 34 and rheostat 35, which may be optionally employed as described above, are shown mounted beneath base plate 54 in Figure 8. Rheostat 35 is provided with adjustment control 130.

*Operation of the toaster shown in Figures 1 to 8*

After the bread is placed on carrier 51 in the raised position shown in Figure 1, operating handle 91 is lowered to depress carriages 67 and 69 and lower the bread carrier. Latch 107 engages extension 103 of carriage 69 and holds the carriages as well as the bread carrier in cooking position.

As shown in Figure 7, depression of carriage 67 lowers cam plate 30 and brings contacts 25 and 27 together. As described in connection with Figure 10, this energizes thermostat heater 4 and produces rapid heating of the bimetal member 2. The bimetal member on being heated snaps over into the position shown in Figure 2 and closes contacts 12 and 13 to energize the main heater 1. Through resistance 33, a limited amount of current is supplied to thermostat heater 4 to delay the cooling of bimetal member 2. As described above, the temperature of resistance 33 varies in accordance with the heat supplied to it by the main heater, and it functions to maintain an equalized heat treatment of the bread and compensates for variations in temperature of the toaster which may result from previous cooking operations. Resistance 33 also compensates in some degree for variations in voltage which occurs in some localities at various periods depending on the main line load.

When the temperature of bimetal member 2 has decreased to the operating value, it snaps back into the position shown in Figure 1. By pawl 123 this releases latch 107 and permits carriages 67, 69 and 86 to rise under the action of lever 75 and raises bread carrier 51. In its upward passage carriage 67 raises cam plate 30 to open contacts 25 and 27. At the same time movement of arm 19 operates switch 5 to open contacts 12 and 13 and close contacts 10 and 11. This deenergizes the main heater and reestablishes the circuit permitting a rapid heating of thermostat heater 4 on subsequent closing of contacts 25 and 27. As described above, the thermostatic time control is immediately available for subsequent operation.

Figure 5:
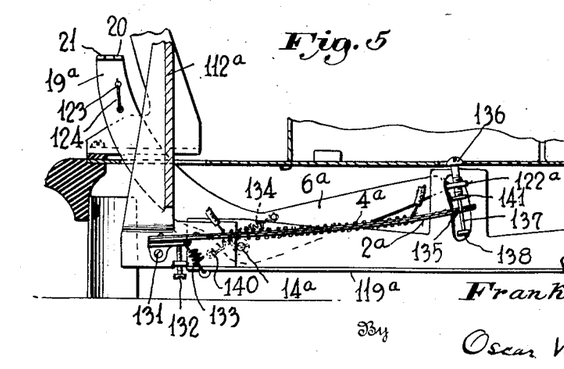
Figure 5 being a fragmentary section showing an alternate embodiment of the thermostatic timing mechanism.

*Figure 5*

In Figure 5 I have shown another thermostatic time control embodying my invention. This comprises a bimetal warp strip 2a adjustably pivoted on pin 131 carried on bracket 112a. The bimetal warp strip is held against adjusting screw 132 by spring 133 which is attached to member 119a. Adjustment of screw 132 is used for varying the operating range of the bimetal warp strip. A heater 4a for the warp strip is provided as in the previous embodiment. Lever 6a is pivoted on pin 14a and is provided with toggle spring 134 which is anchored on bracket 112a at 140. Arm 122a is provided with adjusting screw 136 having a reduced portion 137 passing through aperture 135 in the warp strip. Stops 138 and 141 are provided at either end of reduced portion 137 of adjusting screw 136.

The operation of lever 6a under actuation of bimetal warp strip 2a and toggle spring 134 is similar to the operation of lever 6 by the snap action of bimetal member 2. Upon heating, warp strip 2a moves downwardly to engage stop 138, and upon further movement it rotates lever 6a so that toggle spring 134 is carried over dead center to operate switch 5 by arm 19a. As previously described this produces a controlled cooling of bimetal warp strip 2a which begins to rise. When the warp strip comes into contact with stop 141 it rotates lever 6a in the reverse direction and again causes toggle spring 134 to pass over dead center and return lever 6a to the position shown in Figure 5.

The cooking period is therefore determined by the time required for the bimetal warp strip to cool and move from its hot position to reset lever 6a. As previously described, this cooling period is subject to control by resistance 33 operating in dependency on the temperature of the main heater.

*Diagram views, Figures 12 to 15*

In Figures 12 through 15 I have diagrammatically illustrated a second embodiment of my invention. These views will be described before explaining the structure in which the second embodiment is incorporated, shown in Figure 9.

As previously described in connection with Figures 10 and 11, the main heater is constituted by electrical heating element 1. Thermally responsive resistance 33 is also employed, and is subject to the heat of heater 1. I also utilize switch 24 having contacts 25 and 27, and operated by cam slot 31 of cam plate 30.

I provide switch 150 having leaves 151, 152, 153 and 154. Switch 150 is operated by two thermostatic control members. These control members are preferably snap acting bimetal strips 161 and 162, as shown. I provide heat supply means for the thermostatic control members, shown as resistance 163 for bimetal member 161 and resistance 164 for bimetal member 162. Thermostat heater 163 is provided with terminals 165 and 166, and heater 164 is provided with terminals 167 and 186 and tap 168.

Bimetal member 161 actuates ball crank lever 169 by adjustable screw 170. Lever 169 is pivoted at 171 and is connected to leaf 153 of switch 150 by insulating link 172. Link 172 extends through aperture 173 in leaf 152.

Lever 174 is operated by bimetal member 162 through adjusting screw 175. Lever 174 is pivoted at 176 and actuates latch 177. Latch 177 is pivoted at 178 and is held by spring 179 against the lower edge of leaf 152.

Terminals 180 and 181 represent a source of electric current. Conductor 182 connects terminal 181 to main heater 1. Conductor 183 connects main heater 1 to leaf 151 of switch 150. Conductor 184 connects leaf 152 to terminal 186 of thermostat heater 164. Conductor 185 connects leaf 153 to tap 168. Conductor 187 connects leaf 154 to arm 28 of switch 24. Conductor 188 connects contact 27 of switch 24 to terminal 166 of thermostat heater 163. Conductor 189 connects terminal 166 of thermostat heater 163 to conductor 182. Conductor 190 connects terminal 180 to terminal 167 of thermostat heater 164. Conductor 191 connects thermally responsive resistance 33 to terminal 180, and conductor 192 connects leaf 154 to the other terminal of resistance 33.

*Operation*

Figure 9:
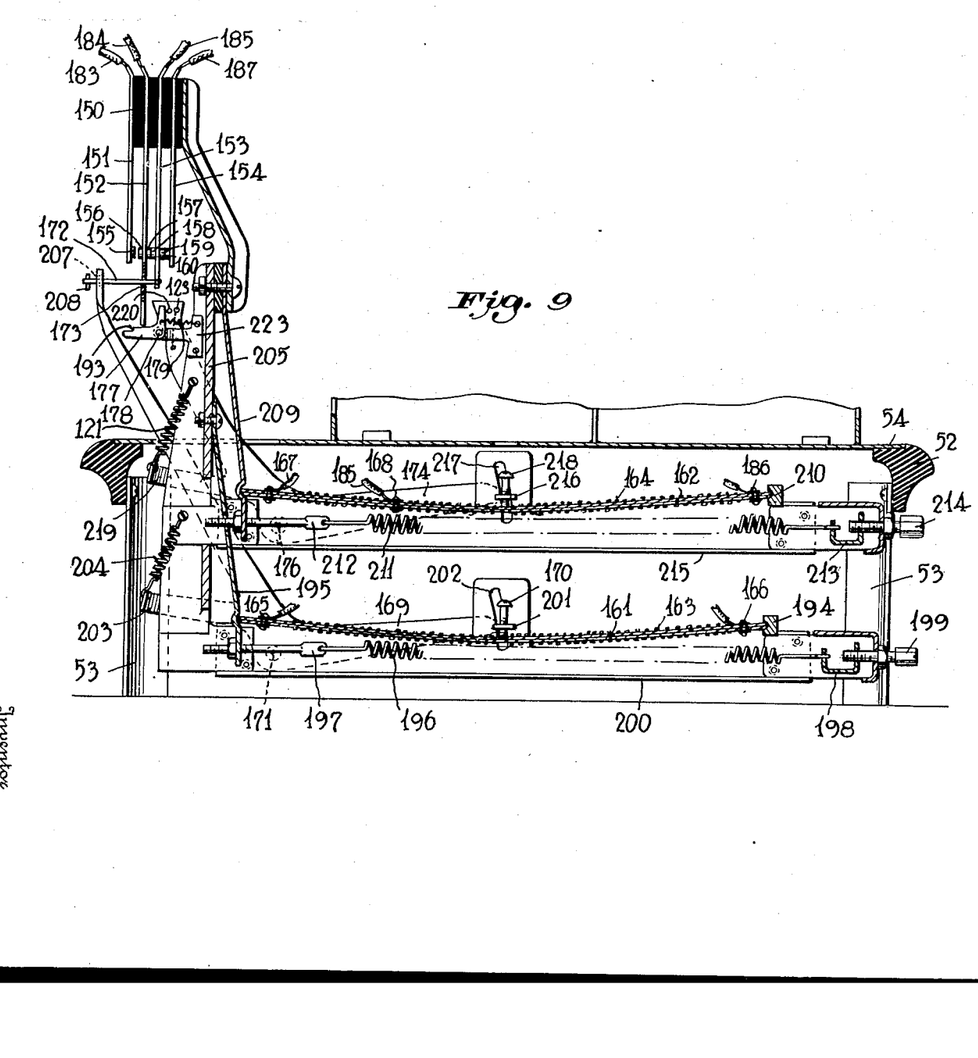
Figure 9 is a vertical front to rear section of a further embodiment of my thermostatic timing mechanism employed as a control in an automatic toaster.

In Figure 9 I have shown the second embodiment of my invention in normal condition. When cam plate 30 is lowered, as previously described, switch 24 is closed to energize thermostat heater 163. Terminal 165 of heater 163 is connected to line terminal 181 through conductors 189 and 182. Terminal 166 of heater 163 is connected to line terminal 180 through conductor 188, switch 24, conductor 187, leaf 154, contacts 160 and 159, leaf 153, conductor 185, resistance 164 between tap 168 and terminal 167, and conductor 190.

Operation of switch 150 by upward movement of bimetal member 161 establishes a limited energization of thermostat heater 163 in the same manner as in the previous embodiment described above. This is accomplished through a circuit including conductor 191, resistance 33, conductor 192, conductor 187, switch 24, conductor 188, thermostat heater 163, and conductors 189 and 182. In the same manner as previously described, thermally responsive resistance 33 controls the rate of temperature loss of bimetal member 161 (see Figure 13).

Figure 14:
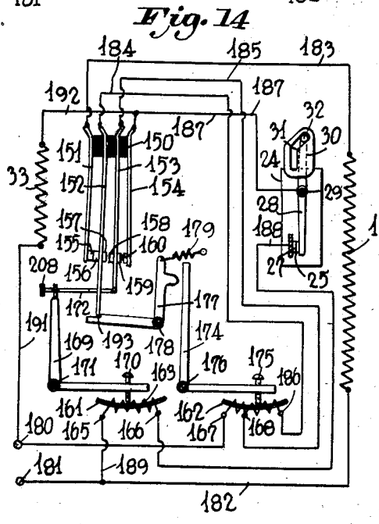

After the desired cooling period during which operation of main heater 1 is maintained, bimetal member 161 reverses its position and by snap action assumes the curvature shown in Figure 14. This permits leaf 153 to assume an intermediate position, opening contacts 157 and 158. Contacts 155 and 156 are held closed by engagement of latch 177 with leaf 152. The opening of contacts 157 and 158 causes the current flowing through the main heater to pass through the whole of thermostat heater 164. The resulting rise in temperature in bimetal member 162 causes the same after a heating period to assume the curvature shown in Figure 15. This turns lever 174 which comes into engagement with latch 177 and rotates the same to release leaf 152 from notch 193.

Figure 15:
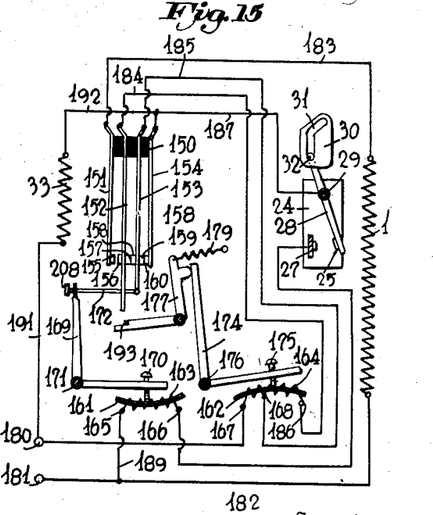

Movement of lever 174 operates to release latch 107 as previously described, and permits cam plate 30 to be raised, opening switch 24. Retraction of latch 177 opens contacts 155 and 156 to deenergize main heater 1. Leaf 152 returns to its normal position, closing contacts 157 and 158, and 159 and 160.

It will therefore be understood that heating of thermostatic control element 162 deenergizes the main heater and releases the bread carrier.

As soon as the main heater is deenergized with the mechanism in the position shown in Figure 15, the toaster is in condition for performing a successive operation immediately. Whereas bimetal member 162 must assume the curvature shown in Figure 12 before latch 177 becomes operative again, this is not necessarily before bimetal member 161 goes through its complete cycle of heating and cooling. This will always allow sufficient time for bimetal member 162 to cool and permit latch 177 to assume the position shown in Figure 12.

In order to avoid too long a cooking period, in the embodiment shown, I have provided tap 168 on thermostat heater 164, so that this thermostat is preheated by the portion of resistance 164 between tap 168 and terminal 167. In case it is desired to prolong the heating period for bimetal member 162, tap 168 may be omitted and conductor 185 connected directly to terminal 167.

In the second embodiment of my invention, therefore, I provide thermostatic time controlled means operative to initiate operation of the main heater on being heated, and operative after a cooling period to initiate heating of a second thermostatic time controlled means which is operative after a heating period to terminate operation of the main heater.

*Figure 9*

I have illustrated in Figure 9 a fragmentary vertical front to rear section of a toaster embodying a thermostatic time control for carrying out the operations described in connection with Figures 12 to 15. I have not illustrated the toaster mechanism, nor the carriages and bread carrier mechanism; which are identical with that previously described in connection with Figures 1 to 8. The mechanical actuation of these mechanisms by the thermostatic time control shown in Figure 9 is identical with that of the thermostatic time controls described above, and is effected through pawl 123 carried by lever 174 which operates on latch 107.

Bimetal member 161 is shown supported on block 194 and flexible member 195. Spring 196 is provided for controlling the compression on bimetal member 161, and is connected by link 197 to member 195 and by threaded connector 198 to adjusting screw 199. Adjustment of screw 199 varies the compression of bimetal member 161 and controls its operating temperature.

Lever 169 is pivoted to frame 200 by pin 171 and is provided with offset arm 201 which passes through slot 202 in frame 200 and overlies bimetal member 161. Adjusting screw 170 is provided in arm 201 for engagement with bimetal member 161.

Lever 169 is provided with arm 203. Tension spring 204 connects arm 203 to bracket 205 for holding adjusting screw 170 in engagement with bimetal member 161.

The upper end of lever 169 is provided with aperture 207 through which insulating link 172 attached to leaf 153 of switch 150 passes. Link 172 is provided with stop 208 with which lever 169 engages to actuate leaf 153.

Bimetal member 162 is supported between block 210 and flexible member 209. The compression on bimetal member 162 is controlled by spring 211 connected by link 212 to flexible member 209 and by threaded connector 213 to adjusting screw 214. Variation in the tension of spring 211 by adjusting screw 214 is used to control the operating temperature of bimetal member 162.

I provide lever 174 pivoted on pin 176 in frame 215 with offset arm 216 passing through slot 217 of frame 215. Arm 216 overlies bimetal member 162 and is provided with adjustable screw 218 which bears on bimetal member 162.

Lever 174 is provided with arm 219. Tension spring 221 connects arm 219 to bracket 205 for holding adjusting screw 218 in contact with bimetal member 162.

At the upper end of bracket 205 I provide arm 223 which supports pin 178 on which latch 177 is rotatably mounted. Spring 179 connects latch 177 to bracket 205 and normally biases latch 177 into contact with leaf 152.

At the upper end of lever 174 is provided pin 220 engageable with latch 177 to rotate the same against the action of spring 179 upon movement of lever 174 caused by heating of bimetal member 162.

Lever 174 also carries pawl 123 and its actuating spring 124. As described previously, pawl 123 operates on latch 107 to release carriages 67 and 69 which raise the bread carrier and, through cam plate 30, open contacts 25 and 27.

The operation of the mechanism shown in Figure 9 will be understood by reference to the description of Figures 12 through 15.

*Signal device operated by thermostatic timer*

Figure 16:
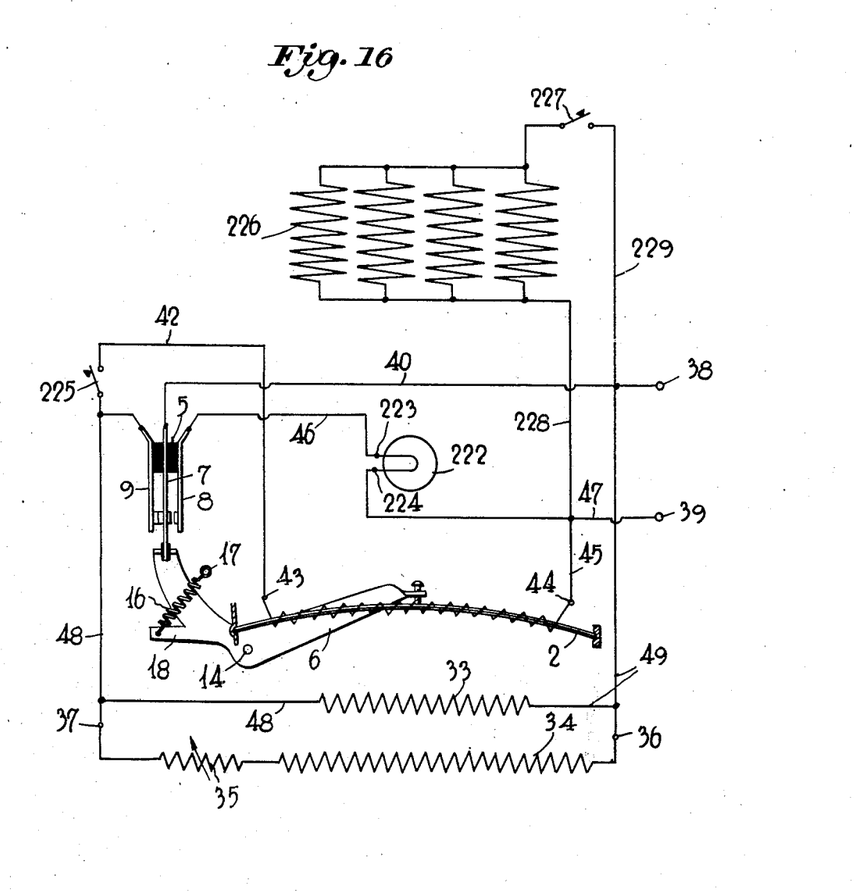
Figure 16 is a diagrammatic view illustrating the use of my timing mechanism in establishing the cooking period of a cooking apparatus through a signal device, and showing the operating circuits in such an arrangement.

In Figure 16 I have shown diagrammatically my thermostatic timer in a circuit for operating a signal device.

Main heater 226, as shown, comprises electrical resistance elements connected to line terminals 38 and 39 by conductors 228 and 229 respectively. Switch 227 is provided in conductor 229 for controlling operation of the main heater.

I provide signal lamp 222 for indicating the cooking period. The thermostatic timer shown in Figure 16 for operating signal lamp 222 is in all respects similar to that shown in Figures 10 and 11, with the exception that the signal lamp is substituted in the circuit for main heater 1, and switch 225 is substituted for cam operated switch 24. It will be understood that the thermally responsive resistance 33 is adapted to be heated by main heater 226 and function as previously described.

The operation of the mechanism shown in Figure 16 is particularly adapted for use in a waffle iron or similar cooker where it is customary to maintain continuous operation of the main heater. This is accomplished by closing switch 227.

Signal lamp 222 is utilized for indicating the desired cooking period. The operation of the timer is initiated by closing of switch 225. As will be understood from the previous description, this produces a rapid heating of the bimetal member which, upon moving to its heated position, energizes lamp 222 and indicates the beginning of the cooking period. During the cooling of the thermostat, lamp 222 is maintained in operation until the bimetal member moves to its cold position and terminates operation of the lamp to indicate the end of the cooking period.

As previously described, thermally responsive resistance 33 varies the cooking period in accordance with the temperature of main heater 226 to correct for variations in the temperature of the cooker depending on the rapidity with which succeeding cooking operations are carried out.

Variable resistance 35 may be used for selecting the desired cooking interval for the material to be treated.

The thermostatic timer in Figure 16 is adapted to operate continuously to indicate a series of successive cooking intervals. This is accomplished because switch 225 remains closed, and when the bimetal member moves to its cold position the actuation of switch 5 causes a quick heating of the bimetal member again, so that a successive timing cycle follows each cooling of the thermostat.

If it is desired to terminate the operation of the thermostatic timer after one operation, switch 24 and its thermostatically controlled actuating means may be substituted for switch 225 so that upon movement of the thermostatic member to its cold position the circuit is broken and the timer does not operate in a succeeding cycle. It will be understood that the circuit as shown in Figure 16 operates to indicate a series of successive cooking intervals until switch 225 is opened. Operation of the cooker is terminated by opening switch 227 to deenergize main heater 226, as well as switch 225 to terminate operation of the thermostatic timer.

I claim:

1. In a bread toasting device, a heater, a toasting space heated by the heater, timing means determining the toasting period of the heater comprising thermally responsive means becoming operative upon movement by heating to a predetermined temperature to initiate operation of said heater to raise the temperature of the space and start the toasting period, and means for terminating operation of said heater to lower the temperature of the space and end the toasting period operating in dependency on cooling of the thermally responsive means to a predetermined lower temperature.

2. In a bread toasting device, a toasting space, a primary heater for heating the space to toasting temperature, and timing means determining the toasting period of the heater comprising a thermally responsive element adapted to be heated during a period preliminary to operation of the primary heater and having a following cooling period, auxiliary heating means for heating the thermally responsive element during its preliminary period, and control means for establishing timed intervals of toasting operation of the primary heater responsive to the thermally responsive element at the beginning of its cooling period to initiate toasting operation of the primary heater and start the toasting period in said space and being adapted as a result of cooling of the thermally responsive element to render the primary heater inoperative and discontinue the toasting period in said space.

3. In a heating device, a primary heater, thermostatic control means for establishing timed operating intervals for the primary heater operative on heating to initiate operation of the heater and operative on cooling to terminate operation of the heater, means for heating the thermostatic control means controlled by said thermostatic control means, and means for decreasing the cooling rate of the said thermostatic control means in such a manner as to increase the timed interval of operation of the said primary heater.

4. In a heating device, a primary heater, thermostatic control means for establishing timed intervals of operation of the primary heater the said thermostatic control means adapted as the result of preliminarily heating to initiate operation of the heater and the said thermostatic control means adapted as the result of a cooling period to terminate operation of the heater, means for preliminarily heating the thermostatic control means, and variable control means controlled by said thermostatic means and said primary heater for decreasing the cooling rate of the said thermostatic control means in such a manner as to increase the timed interval of operation of the said primary heater.

5. In a heating device, a primary heater, thermostatic control means for establishing timed intervals of operation of the primary heater, the said thermostatic control means adapted as the result of being preliminarily heated to initiate operation of the heater and the said thermostatic control means adapted as the result of a cooling period to terminate operation of the heater, and variable heating means adapted to preliminarily heat the thermostatic control means rapidly and becoming operative in dependency on heating of the thermostatic control means to supply heat at a reduced rate to control the cooling rate of the thermostatic control means.

6. In a heating device, a primary heater, thermostatic control means for establishing timed intervals of operation of the primary heater operative to initiate operation of the heater and the said thermostatic control means adapted as the result of a cooling period to terminate operation of the heater, variable heat supply means adapted to preliminarily heat the thermostatic control means and operable thereafter to control the cooling period of the thermostatic control means, and control means for the heat supply means for varying the rate of cooling of the thermostatic control means.

7. In a heating device, a primary heater, and mechanism for timing operation of the primary heater including a thermally responsive element initially movable by heating to a predetermined high temperature position and then cooling and movable reversely from said high temperature position to a predetermined lower temperature position, electrical heating means initially operative to supply heat sufficient to move the thermally responsive element to its high temperature position and operable during cooling of the element to control the rate of cooling, means for supplying operating electric current to said electrical heating means operable to supply less current thereto during the cooling period than during the heating period of the thermally responsive element, and means operating in dependency on cooling movement of the element to its lower temperature position for setting the time for terminating operation of the primary heater.

8. In a heating device, a primary heater, and mechanism for timing operation of the primary heater including a thermally responsive element initially movable by heating to a predetermined high temperature position and then cooling and movable reversely from said high temperature position to a predetermined lower temperature position, electrical heating means for heating the thermally responsive element operative during the heating period of the element, and also operative during the cooling period of the element to control its rate of cooling, means for supplying current to the heating means during the heating period of the element sufficient to cause the heating means to move the element to its high temperature position, said supply means being rendered inoperative by the thermally responsive element upon reaching its high temperature position, further current supply means including electrical resistance means for supplying current in less amount to the heating means during the cooling period of the thermally responsive element, said further current supply means being rendered operative by the thermally responsive element upon reaching its high temperature position, and means operating in dependency on cooling movement of the element to its lower temperature position for setting the time for terminating operation of the primary heater.

9. In a bread toasting device, a toasting space, a primary heater for heating the space to toasting temperature, and timing mechanism for determining the toasting period of the heater comprising thermostatic control means for the heater including a bowed bimetallic member operative upon preliminary heating to assume the opposite bowed curvature by snap action and thereupon initiate operation of the primary heater and start the toasting period in said space, auxiliary heating means for preliminarily heating the bimetallic member and control means for said last mentioned means operative to terminate said preliminary heating on snap action by the bowed metallic member.

10. In a bread toasting device, a toasting space, a primary heater for heating the space to toasting temperature, and timing mechanism determining the toasting period of the heater comprising thermostatic control means for the heater including a bowed bimetallic member operative upon preliminary heating to assume the opposite bowed curvature by snap action and thereupon initiate operation of the primary heater and start the toasting period in said space, and said bimetallic member being operative thereafter upon cooling to return to its initial bowed curvature by snap action and thereupon render the primary heater inoperative and end the toasting period in said space, means for preliminarily heating the bimetallic member and control means for said last mentioned means operative to terminate said preliminary heating on snap action by the bowed metallic member from its initial to its opposite bowed curvature.

11. In a bread toasting device, a toasting space, a primary heater for heating the space to toasting temperature, thermostatic control means for establishing intervals of time action of the primary heater operative upon heating to initiate operation of the heater, means for preliminarily heating the thermostatic control means, means operating in dependency on cooling of the thermostatic control means for terminating operation of the primary heater, and variable control means operating in dependency on the temperature of the primary heater for delaying the rate of cooling of the thermostatic control means.

12. In a bread toasting device, a toasting space, a primary heater for heating the space to toasting temperature, thermostatic control means operative to control toasting operation of the heater, electrical heating means adapted to supply heat at a variable rate to the thermostatic control means, and control means for said electrical heating means operating in dependency on the temperature of the primary heater to vary the rate of application of heat by said electrical heating means to the thermostatic control means.

13. In a heating device, a primary heater, a thermally responsive element initially movable by heating to initiate operation of the primary heater and reversely movable on cooling, means operating in dependency on cooling movement of the thermally responsive element for terminating operation of the primary heater, electrical heating means for the thermally responsive element operating during its cooling period to control the rate of cooling, and control means for said electrical heater means comprising a thermally variable electrical resistance device subject to the heat of the primary heater and operating to control the heat imparted by the electrical heater means to the thermally responsive element in accordance with the temperature of the primary heater.

14. In a cooking device, a heater and a cooking chamber adapted to be raised to cooking temperature by said heater, and timing mechanism for establishing the cooking period for the article to be cooked by the heater including a thermally responsive element becoming operative upon heating to a predetermined temperature to initiate operation of the heater and start the cooking period in the chamber, and means for terminating operation of the heater and ending the cooking period in the chamber operating in dependency on cooling of said thermally responsive element to a predetermined lower temperature.

15. In a cooking device, a heater and a cooking space adapted to be raised to cooking temperature by the heater, further heating means, and thermal timing mechanism for establishing the cooking period for the article to be cooked by the main heater including a thermally responsive element movable during a preliminary period of heating by said further heating means to a predetermined high temperature limit position and then reversely movable during a cooling period from the predetermined high temperature position to a predetermined lower temperature position, and control means operated by the thermally responsive element at the beginning of its cooling period to initiate operation of the main heater and start the cooking period in said space, and operated by said element at the end of its cooling period to terminate operation of the main heater and end the cooking period in said space.

16. In a cooking device, a heater and a cooking chamber subject to the heat of said heater, and timing mechanism for establishing the cooking period for the article to be cooked by the heater comprising signal means for indicating the cooking period, and thermally responsive means becoming operative when attaining a predetermined temperature to operate the signal means to indicate the start of the cooking period, and means for operating the signal means to indicate the end of the cooking period operating in dependency on cooling of said thermally responsive element to a predetermined lower temperature.

17. A cooking device according to claim 15, further including thermostatic control means for the thermally responsive element responsive to temperature conditions in the cooking space operative to control the length of the cooling period of the thermally responsive element.

18. In a bread toaster, an electric heater, a toasting space adapted to be heated by the heater to toasting temperature, a thermally responsive element movable by heating to a predetermined high temperature limit position and then reversely movable during a cooling period from said predetermined high temperature position to a lower temperature position, auxiliary electric heating means for heating the thermally responsive element to its high temperature position preliminary to heating of the toaster space by the main heater, means operative upon said element reaching its high temperature position to start said element cooling and control means for the main heater operated by the thermally responsive element at the beginning of its cooling period to initiate operation of the main heater and start the toasting period and operated by the thermally responsive element at the end of its cooling period to terminate operation of the main heater and end the toasting period.

19. In an automatic toaster, a heater, a toasting space heated by the heater, a bread carrier movable to and from toasting position in the toasting space, a thermally responsive element, heating means rendered operative by the bread carrier upon movement to toasting position to heat the thermally responsive element to a predetermined high temperature, means operative upon said element reaching its predetermined high temperature to start said element cooling from its predetermined high temperature to a predetermined lower temperature, means responsive to heating of the thermally responsive element to its predetermined high temperature to initiate operation of the main heater, and means responsive to cooling of the thermally responsive element to its predetermined lower temperature to terminate operation of the main heater and effect movement of the bread carrier away from toasting position in the toasting space.

20. In a bread toaster according to claim 18, thermally responsive means operating in dependency on the main heater to adjust the temperature of the auxiliary heating means and control the temperature of the thermally responsive element during its cooling period.

21. In a heating device, a heater, power supply means for energizing said heater, electrically controlled timing means for terminating operation of the heater, electrical circuit means independent of the power supply means for the heater for controlling the timing means, and heat responsive electrical resistance means in said electrical circuit means operating in dependency on the temperature of the heater to control operation of the timing means.

22. In a heating device, a heater, power supply means for energizing said heater, electrically controlled timing means for terminating operation of the heater, and electrical circuit means for controlling the timing means including heat responsive electrical resistance means operative to supply an E. M. F. to the timing means varying inversely with the temperature of the main heater.

23. In a cooking device, a cooking chamber, means for raising the temperature of said chamber, timing mechanism controlling the operating period of said means including a thermally responsive element operative upon heating to a predetermined temperature to initiate operation of said means and to raise the temperature of the chamber.

24. In a timer, a thermally responsive element, electrical heating means operative to heat said element to move the same to a predetermined high temperature position, and then allowing the element to cool to a predetermined low temperature position, said electrical heating means operating upon the thermally responsive element during its cooling period to control duration of the cooling period, a timing control member, means for actuating the timing control member operating in dependency on movement of the thermally responsive element to its high temperature position at the end of its heating period, and means for actuating the timing control member operating in dependency on movement of the thermally responsive element to its low temperature position at the end of its cooling period, and thermostatic control means responsive to varying temperature conditions other than the temperature conditions of the thermally responsive element controlling operation of the heating means acting on the thermally responsive element during its cooling period.

25. In a timer, a thermally responsive element, electrical heating means operative to heat said element to move the same to a predetermined high temperature position, and then allowing the element to cool to a predetermined low temperature position, said electrical heating means operating upon the thermally responsive element during its cooling period to control duration of the cooling period, a timing control member, means for actuating the timing control member operating in dependency on movement of the thermally responsive element to its high temperature position at the end of its heating period, and means for actuating the timing control member operating in dependency on movement of the thermally responsive element to its low temperature position at the end of its cooling period, and thermostatic control means responsive to varying temperature conditions other than the temperature conditions of the thermally responsive element to vary the cooling period of the thermally responsive element, the same comprising an electrical resistance element varying its electrical conductivity in response to variations in temperature and being located in a circuit with the electrical heating means operating during the cooling period of the thermally responsive element to control the heat produced by said means.

26. An automatic toaster comprising toast heating elements, a bread carrier movable to and from toasting position relatively to said heating elements and biased to non-toasting position, a latch to hold the carrier in toasting position, a bimetal bar, an electric heater therefor, a switch means for controlling said heating elements and said electric heater, said switch means upon movement of said carrier to toasting position and without energizing the toast heating elements being effective to cause energization of said heater and heating of the bimetal bar to a predetermined high temperature position, said bar upon reaching said high temperature position actuating said switch means to cause partial deenergization of said electric heater and energization of said heating elements, said bimetal bar then cooling from its predetermined high temperature to a predetermined lower temperature and effective at said predetermined lower temperature to cause release of said latch with return of the carrier to non-toasting position and actuate the switch means to cause deenergization of said toast heating elements.

27. In a bread toasting device, a toasting space, a primary heater for heating the space to toasting temperature, and timing means determining the toasting period of the heater comprising a primary thermostatic control means therefor adapted as the result of heating to a predetermined temperature to initiate operation of the heater and start the toasting period in said space, means adapted as the result of cooling of the said primary thermostatic control means to a lower temperature to terminate operation of the heater and end the toasting period in said space, and auxiliary control means for delaying termination of the operation of the heater by said primary thermostatic control means.

FRANK W. SCHARF.